(12) United States Patent
Branson et al.

(10) Patent No.: US 9,734,038 B2
(45) Date of Patent: Aug. 15, 2017

(54) PATH-SPECIFIC BREAK POINTS FOR STREAM COMPUTING

(71) Applicant: International Business Machines Corporation, Armonk, NY (US)

(72) Inventors: Michael J. Branson, Rochester, MN (US); James E. Carey, Rochester, MN (US); Bradford L. Cobb, Cedar Park, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 14/501,320

(22) Filed: Sep. 30, 2014

(65) Prior Publication Data

US 2016/0092345 A1 Mar. 31, 2016

(51) Int. Cl.
*G06F 17/30* (2006.01)
*G06F 11/36* (2006.01)
*G06F 9/44* (2006.01)
*H04L 12/24* (2006.01)

(52) U.S. Cl.
CPC ........ *G06F 11/362* (2013.01); *G06F 11/3636* (2013.01); *G06F 11/3664* (2013.01); *H04L 41/0813* (2013.01); *H04L 41/12* (2013.01)

(58) Field of Classification Search
CPC ............... G06F 11/3636; G06F 11/362; G06F 17/30516; G06F 17/30445; G06F 11/30545; G06F 17/30545
See application file for complete search history.

(56) References Cited

U.S. PATENT DOCUMENTS

| 7,613,848 | B2 | 11/2009 | Amini et al. |
| 7,644,110 | B2 | 1/2010 | Nishizawa et al. |
| 7,890,649 | B2 * | 2/2011 | Gu .................... G06F 17/30516 709/233 |
| 8,051,069 | B2 * | 11/2011 | Johnson ............ G06F 17/30516 707/718 |
| 8,095,690 | B2 | 1/2012 | Kashiyama et al. |

(Continued)

OTHER PUBLICATIONS

Glavic et al., Efficient Stream Provenance via Operator Instrumentation, Jul. 2014, 26 pages.*

(Continued)

*Primary Examiner* — Thuy Dao
(74) *Attorney, Agent, or Firm* — Nathan M. Rau

(57) ABSTRACT

A plurality of processing elements having stream operators and operating on one or more computer processors receive a stream of tuples. A first stream operator adds a first attribute to a tuple received on a first port of the first stream operator. The first attribute indicates the first port and the first stream operator. A second stream operator adds a second attribute to a tuple received on a first port of the second stream operator. The second attribute indicates the first port of the second stream operator and the second stream operator. It is determined whether a debug tuple has been received by a third stream operator. A debug tuple is a tuple that includes the first and second attributes. An operation, such as halting execution or incrementing a count of debug tuples, is performed when it is determined that a debug tuple has been received.

19 Claims, 12 Drawing Sheets

(56) References Cited

U.S. PATENT DOCUMENTS

| | | | |
|---|---|---|---|
| 8,296,316 B2* | 10/2012 | Jain | G06F 17/30516 707/713 |
| 8,296,331 B2 | 10/2012 | Chkodrov et al. | |
| 8,381,233 B2 | 2/2013 | Ali et al. | |
| 8,521,867 B2* | 8/2013 | Srinivasan | G06F 17/30412 707/770 |
| 8,543,558 B2 | 9/2013 | Srinivasan et al. | |
| 8,560,526 B2 | 10/2013 | Santosuosso et al. | |
| 8,903,866 B2 | 12/2014 | Branson et al. | |
| 8,924,939 B2 | 12/2014 | Branson et al. | |
| 8,990,416 B2* | 3/2015 | Shukla | G06F 17/30516 709/224 |
| 9,002,846 B2 | 4/2015 | Branson et al. | |
| 9,183,107 B2 | 11/2015 | Branson et al. | |
| 9,473,550 B2* | 10/2016 | Branson | H04L 65/60 |
| 2007/0226188 A1* | 9/2007 | Johnson | G06F 17/30516 |
| 2012/0137178 A1* | 5/2012 | Barsness | G06F 11/362 714/35 |
| 2012/0218268 A1 | 8/2012 | Accola et al. | |
| 2012/0324453 A1 | 12/2012 | Chandramouli et al. | |
| 2013/0007044 A1* | 1/2013 | Eshwar | G06F 17/30516 707/769 |
| 2013/0080655 A1* | 3/2013 | Barsness | G06F 9/5083 709/231 |
| 2013/0305227 A1 | 11/2013 | Branson et al. | |
| 2014/0289240 A1 | 9/2014 | Barsness et al. | |
| 2015/0007144 A1 | 1/2015 | Barsness et al. | |

OTHER PUBLICATIONS

Hirzel et al., A catalog of stream processing optimizations, Apr. 2014, 34 pages.*

"Accelerated Examination Support Document", International Business Machines Corporation, dated Dec. 22, 2015, 15 pages.

Branson et al., "Path-Specific Break Points for Stream Computing", U.S. Appl. No. 14/983,661, filed Dec. 30, 2015.

List of IBM Patents or Patent Applications Treated as Related, dated Dec. 22, 2015, pp: 1-2.

Jain, et al., "Towards a Streaming SQL Standard," PVLDB 08, Aug. 23-28, 2008, Auckland, New Zealand, pp. 1379-1391, Copyright 2008 VLDB Endowment.

Gedik, et al., "CellJoin: a parallel stream join operator for the cell processor," The VLDB Journal, Mar. 2009, pp. 501-519, Copyright Springer-Verlag 2008.

Zhang, et al., "Workload Characterization for Operator-Based Distributed Stream Processing Applications," DEBS'10, Jul. 12-15, 2010, Cambridge, UK, pp. 235-247, Copyright 2010 ACM.

Ballard et al., "IBM InfoSphere Streams: Harnessing Data in Motion," Sep. 2010, 360 pages, IBM Redbooks http://www.redbooks.ibm.com/abstracts/sg247865.html.

* cited by examiner

… (US 9,734,038 B2)

PATH-SPECIFIC BREAK POINTS FOR STREAM COMPUTING

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive a stream of tuples to be processed by a plurality of processing elements operating on one or more computer processors, each processing element having one or more stream operators. According to various embodiments, a method can include adding, by a first stream operator, a first attribute to a tuple received on a first port of the first stream operator, the first attribute indicating the first port of the first stream operator and identifying the first stream operator. In addition, a method can include adding, by a second stream operator, a second attribute to a tuple received on a first port of the second stream operator, the second attribute indicating the first port of the second stream operator and identifying the second stream operator. It may be determined whether a debug tuple has been received by a third stream operator, the debug tuple being a tuple that includes the first and second attributes. In addition, an operation can be performed in response to determining that a debug tuple has been received. In various embodiments, the operation is halting execution of program instructions at the third stream operator. In various other embodiments, the operation is incrementing a count of debug tuples received at the third stream operator.

BRIEF DESCRIPTION OF THE DRAWINGS

Like reference numbers and designations in the various drawings indicate like elements.

DETAILED DESCRIPTION

Figure 1:
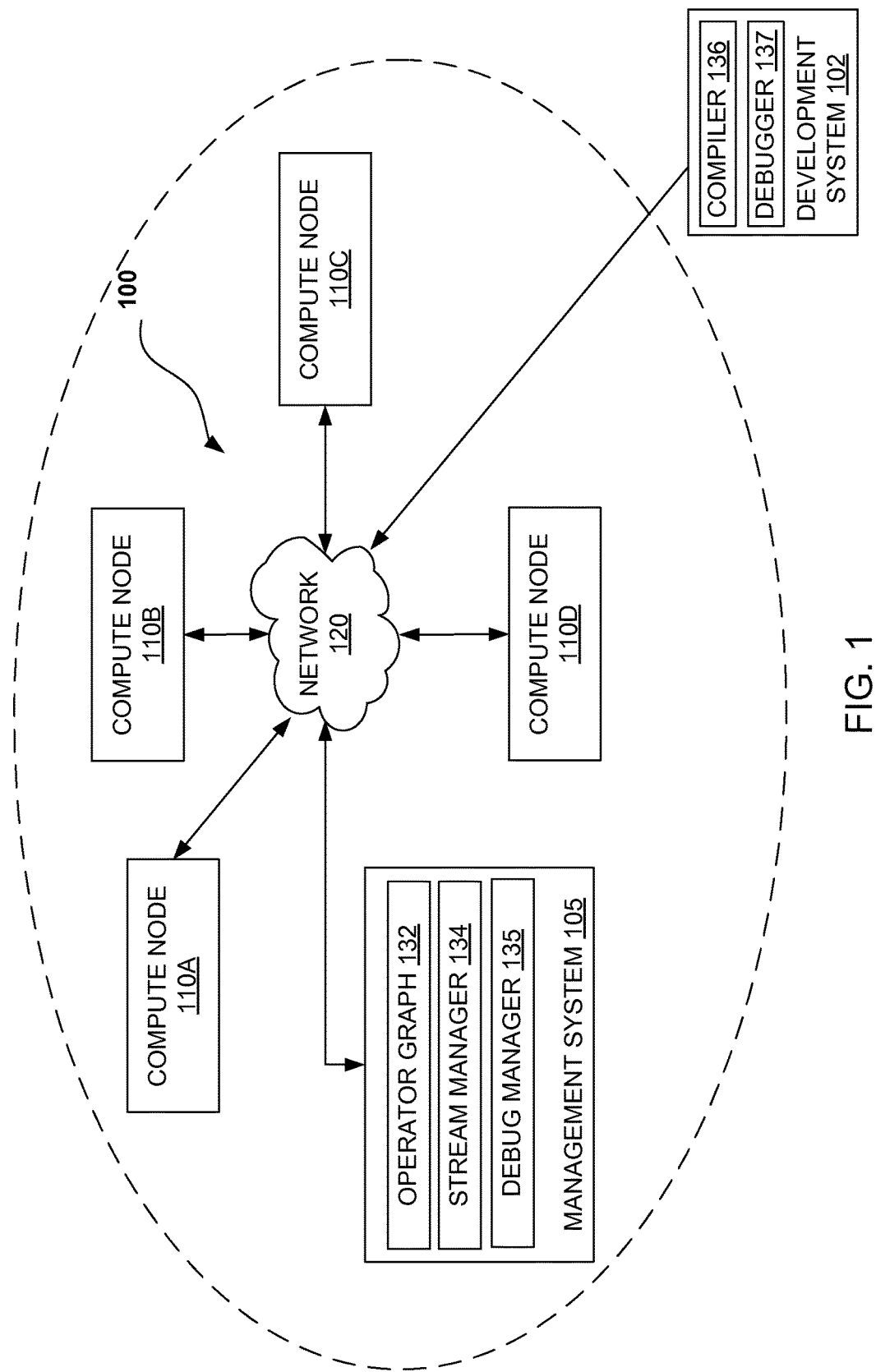
FIG. 1 illustrates a computing infrastructure configured to execute a stream computing application according to various embodiments.

As further described below, stream-based computing typically distributes processing across many compute nodes. It can be difficult to debug a stream-based application because of this distributed processing. While a break point can be set in the program instructions of a particular stream operator running on one of the nodes, the data that causes those instructions to execute may arrive on a variety of different paths through an operator graph. An exception at the particular stream operator may be associated with one but not all of several paths to the stream operator. According to various embodiments, a break point can be associated with data that arrives at the operator via a specified path. Embodiments can be employed to determine that exceptions are associated with a particular path through the operator graph. Moreover, embodiments can be employed to determine that exceptions are not associated with other paths through the operator graph, permitting a developer to eliminate the other paths when investigating a cause of exceptions.

Generally, embodiments do not require additional data transport infrastructure. Rather, according to various embodiments, first and second stream operators are identified to define or specify a "break point" path. In addition, a third stream operator is configured with a break point that is associated with the break point path. The first and second stream operators are configured as recording stream operators that add attributes to tuples that traverse the path. In an alternative embodiment, first and second decorator stream operators can be configured to add attributes to tuples that traverse the path. A tuple that has these attributes added to it may be referred to herein as a "debug tuple." The added attributes permit a third stream operator that has a break point associated with the break point path to distinguish tuples that it receives via the break point path from other tuples it receives that arrive via other paths. Alternatively, added attributes permit a decorator stream operator configured with a break point associated with the break point path to distinguish tuples that it receives via the break point path. In some embodiments, optional attributes can be added to the debug tuple, which can include a time stamp, a processing time parameter, or information about the execution environment. In some embodiments, the break point may be triggered by receipt of a debug tuple that traverses the break point path. In other embodiments, the break point may be triggered by a debug tuple and meeting one or more additional conditions or qualifiers, the break point may be i.e., contingent on a condition. For example, a condition can be related to the hardware or software environment (e.g., machine type, operating system type, version of operating system or other software or firmware component, available memory, or the like), a time parameter, the streaming application, or the particular data being processed. These conditions may be referred to as execution environment conditions. In various embodiments, it is determined whether an execution environment condition is true. Whether an operation is performed is contingent on determining that the execution environment condition is true. For example, satisfying the break point condition, i.e., a condition is true, may cause execution of program instructions on the third stream operator to halt. In some embodiments, however, satisfying the break point condition does not halt execution of program instructions on the third stream operator. Instead, the break point can cause a count of debug tuples to be incremented. Some stream operators have many input paths and the instructions in the operator are executed with great frequency. It can be impractical to set a break point in stream operator with many input paths or that includes instructions frequently executed. It can be impractical because the break point would be triggered with great frequency. The count of debug tuples may permit a developer to determine the number of times the program instructions on the third stream operator are invoked by tuples arriving on the debug path without throwing an exception. A count of debug tuples may be useful to eliminate a particular path as a likely source of a problem. As one example, a particular stream operator could have a dozen input paths and the disclosed embodiments would permit a developer could individually test each path.

According to various embodiments, once a debug tuple is received at a stream operator configured with a break point associated with a break point path, the added attributes can be removed from the tuple before it passed down stream. In some embodiments, an added attribute may be used to define two or more break point paths. Where an added attribute is used to define more than one break point path, the added attribute is not removed until the debug tuple arrives at the stream operator configured with a break point which is the last stream operator in an operator graph to receive the debug tuple.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

"Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Specifically, as further described below, a break point path in an operator graph may be defined by two or more stream operators. For example, a first stream operator provides its output to a second stream operator. The second stream operator provides its output to a third stream operator, and so on. The first, second, third, and additional operators can define a break point path. When a particular tuple "A" is received by the first stream operator, the corresponding tuple output from the first stream operator is referred to herein as the same tuple A. And after the tuple A is output from the first stream operator and received by the second stream operator, the corresponding tuple output by the second stream operator is referred to herein as the same tuple A. More generally, a tuple input to a stream operator at the head of the break point path may be referred to as the same tuple at the input and output of each subsequent stream operator in the path.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
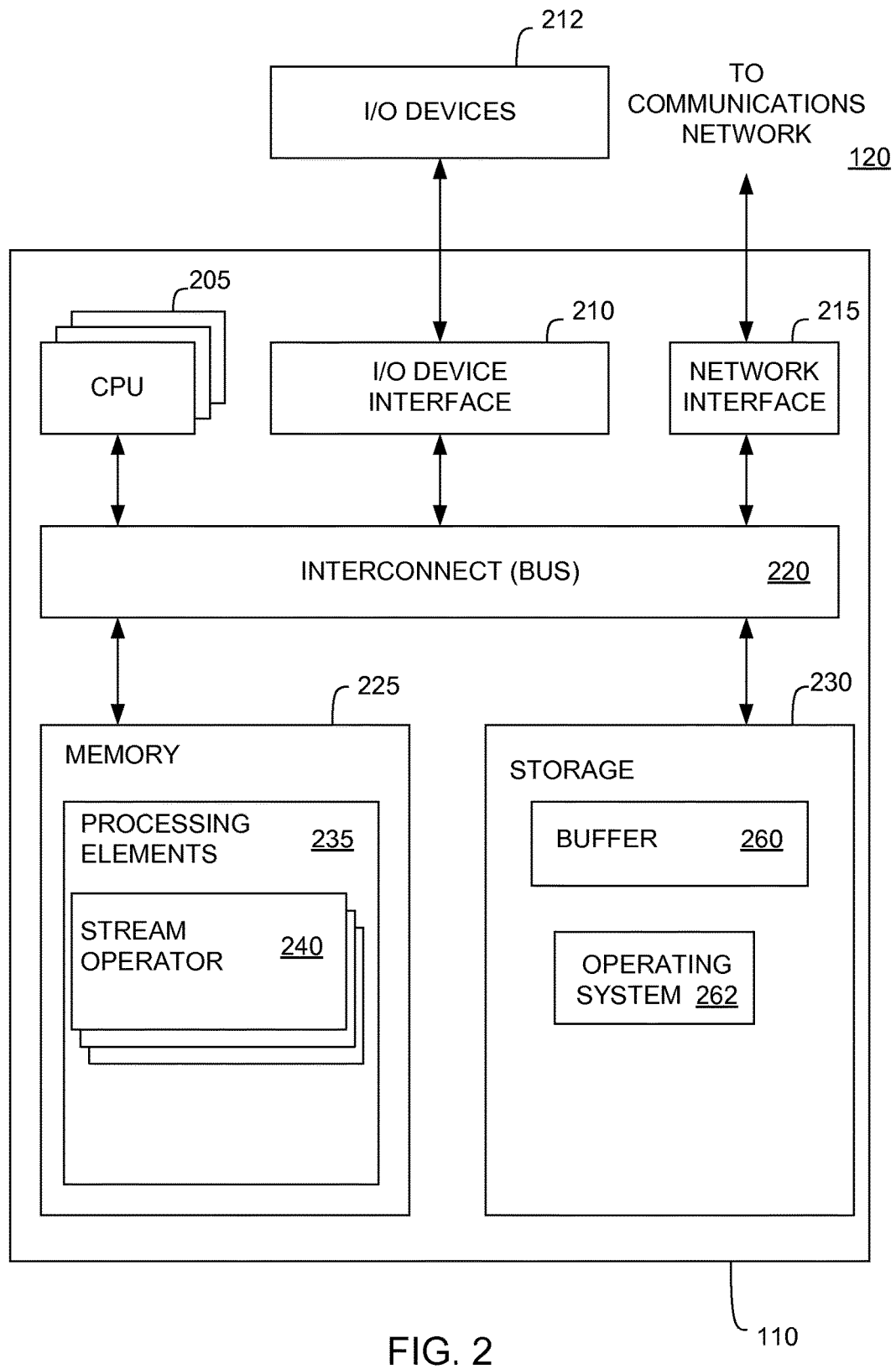
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
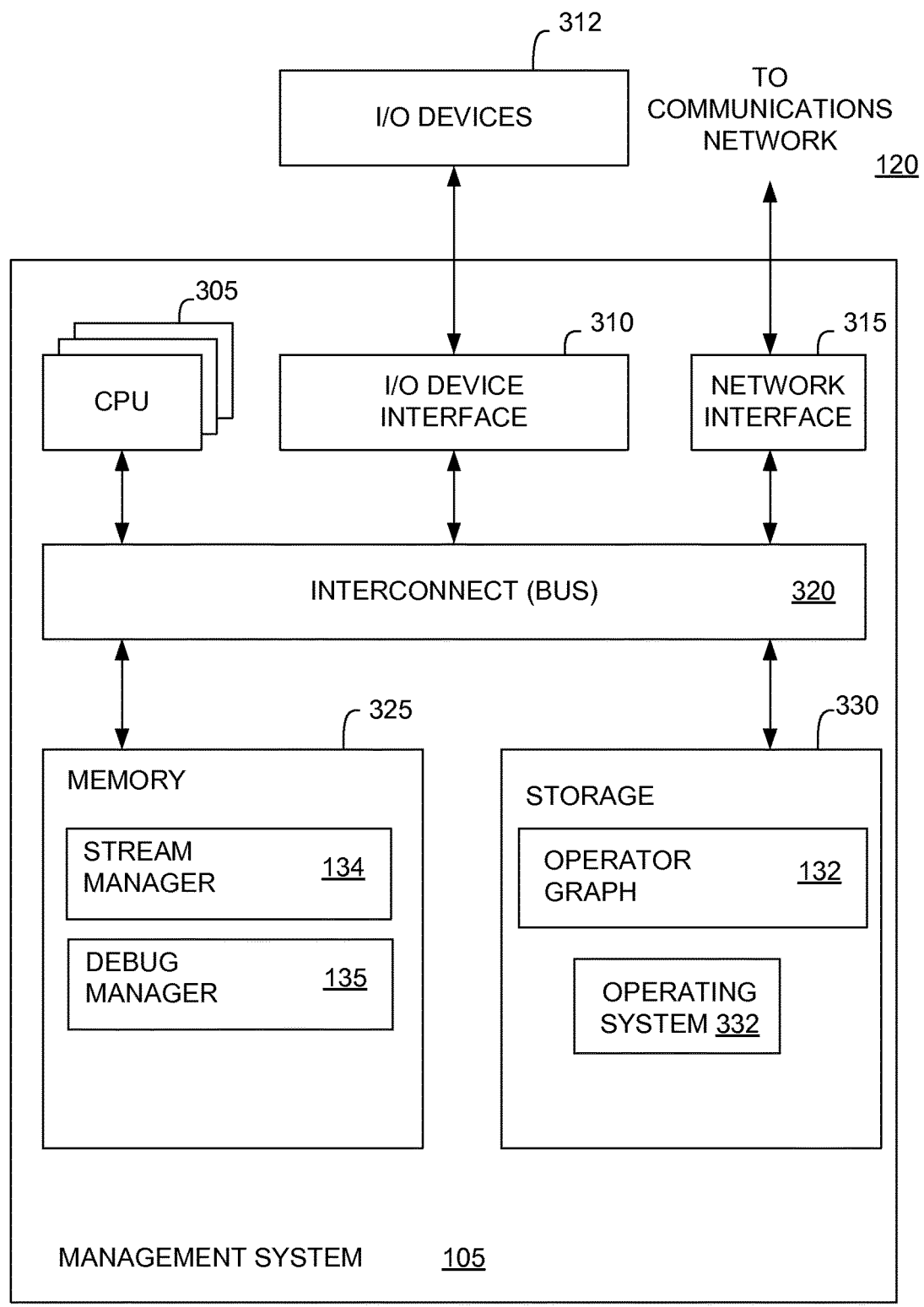
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134 and a debug manager 135. Additionally, the storage 330 may store an operator graph 335. The operator graph 335 may define how tuples are routed to processing elements 235 (FIG. 2) for processing. The debug manager 135 can be used to control when attributes added to a debug tuple are removed from the tuple, as further described below.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
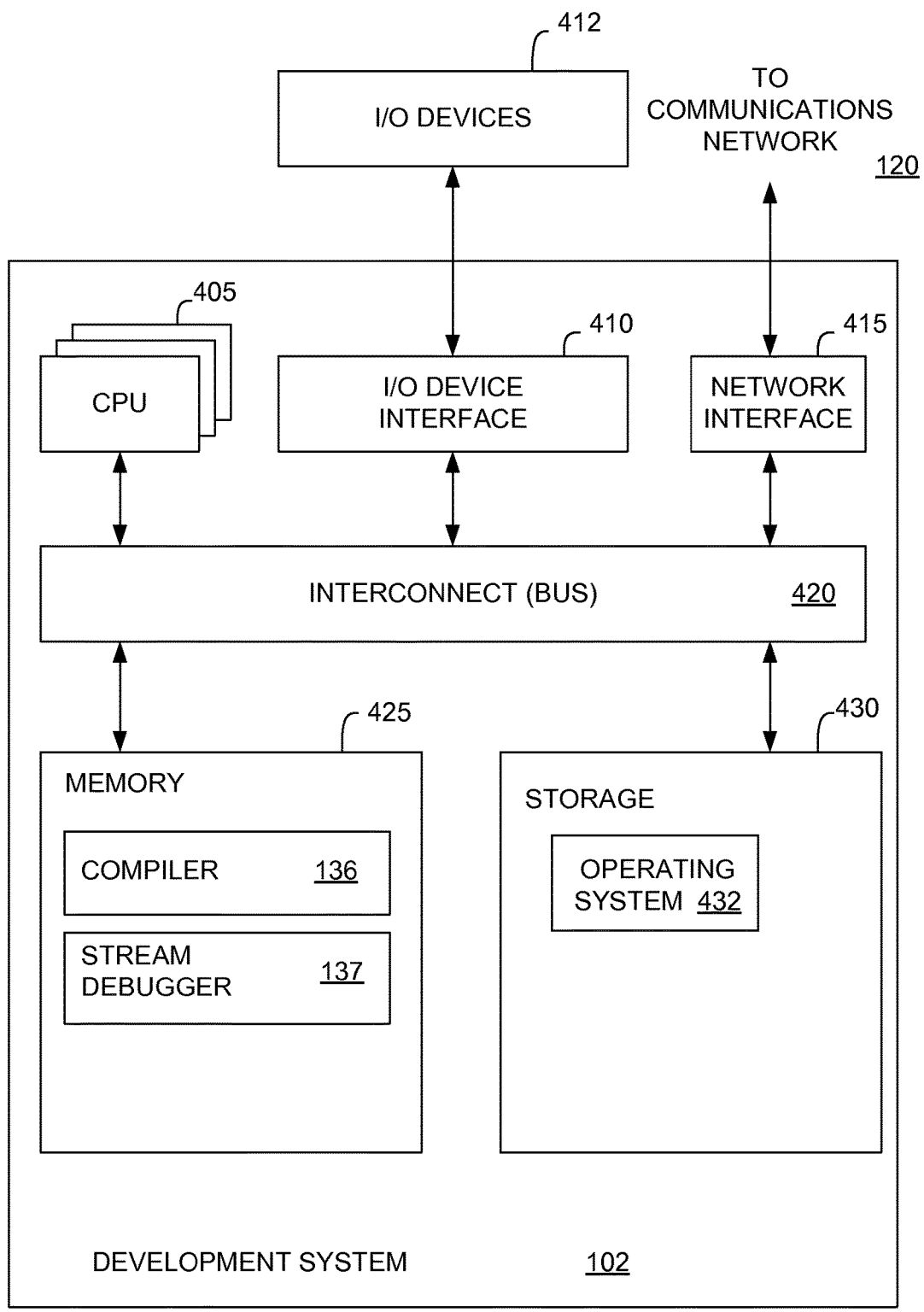
FIG. 4 illustrates a more detailed view of the development system of FIG. 1 according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136 and a stream debugger 137. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

The stream debugger 137 may be used to set a break point in a processing element, which is associated with a particular path in an operator graph. In addition, the stream debugger 137 may be used to configure a processing element to record one or more attributes in a tuple it receives. The attributes added to the tuple by a processing element can be used to specify a path associated with a break point. The one or more attributes can include identifiers of the input port and processing element that received the tuple. The one or more attributes can include optional attributes described herein.

Figure 5:
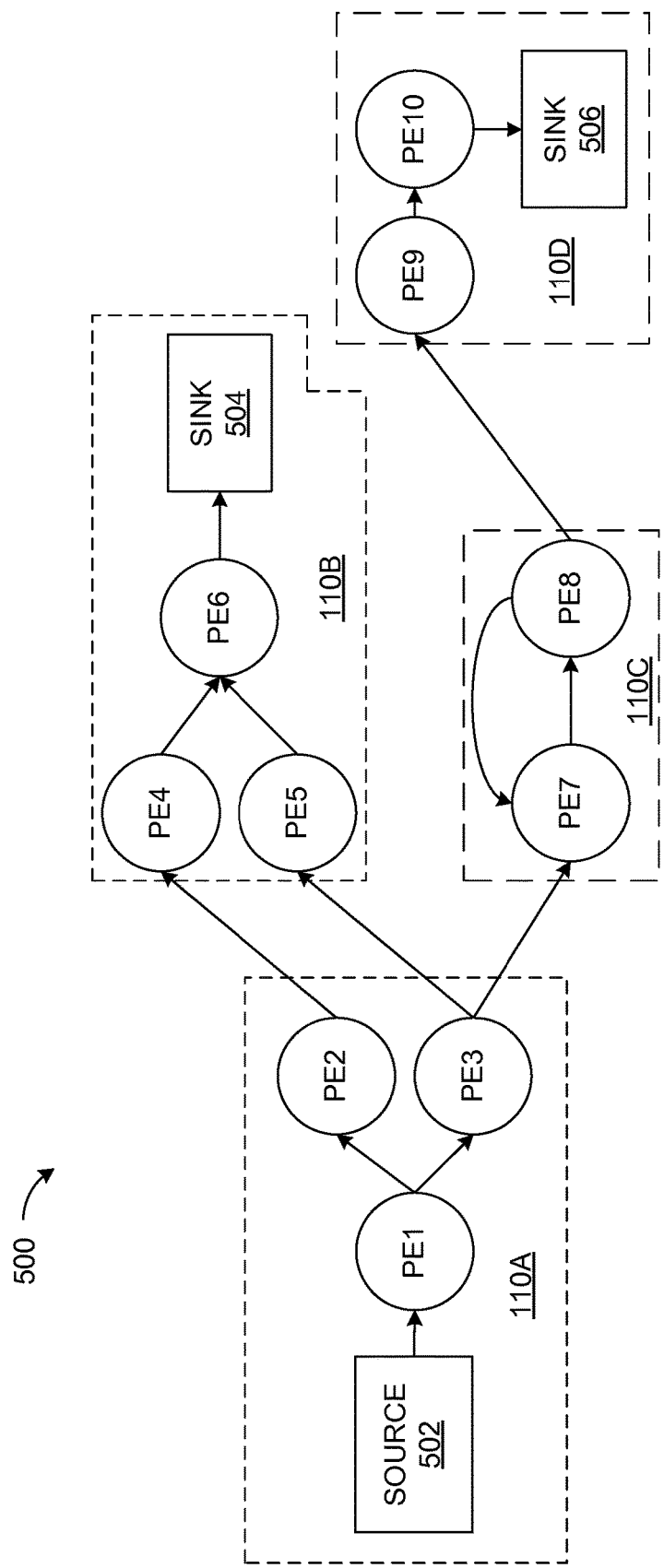
FIG. 5 illustrates an operator graph for a stream computing application according to various embodiments.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2)

within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
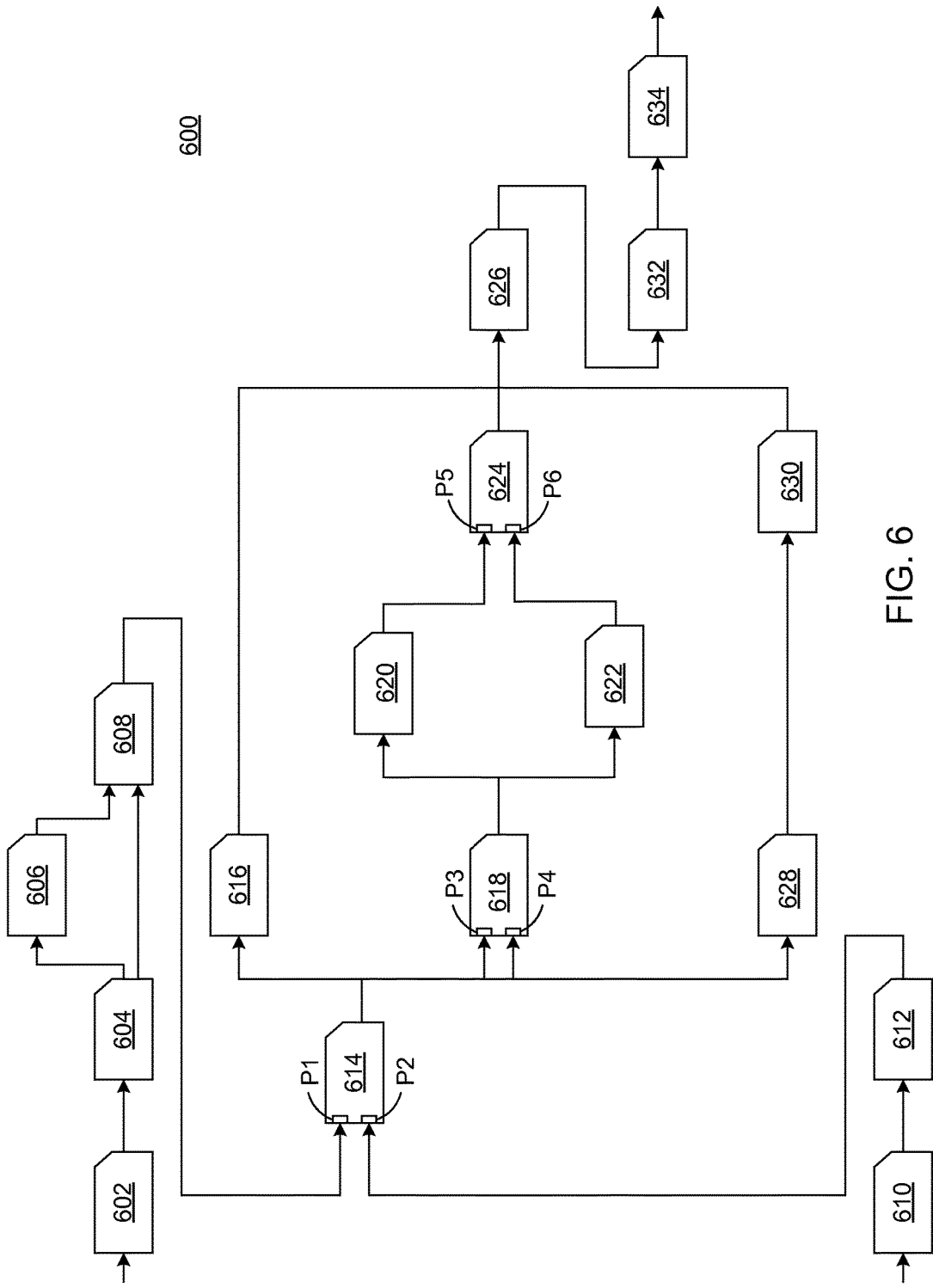
FIG. 6 is an example of a portion of an operator graph for a stream-based computing application shown at the stream operator level, according to various embodiments.

FIG. 6 is an example of a portion of an operator graph for a stream-based computing application shown at the stream operator level, according to various embodiments. The operator graph portion 600 shown in FIG. 6 includes stream operators 602-634, which may be included in one or more processing elements. In an embodiment, each of the stream operators shown in FIG. 6 runs in a distinct processing element. The processing elements that hold the stream operators 602-634 can run in different processes. In addition, the processing elements that hold the stream operators 602-634 can be hosted on different compute nodes.

The operator graph portion 600 begins at stream operators 602 and 610 and ends at stream operator 634. There may be additional stream operators upstream of stream operators 602 and 610 and downstream of stream operator 634. In addition, the operator graph may include stream operators that are neither upstream of stream operators 602 and 610 or downstream of stream operator 634. The stream operators 602-634 can be configured to perform various operations using tuples as required by the application. The stream operators 602-634 may modify various attributes of the tuples as required by the application. These operations and modification are for the purpose of performing functions of the application and are in addition to the novel operations and tuple modifications described herein. A tuple traversing a specified path in the operator graph portion 600 may be referred as the same tuple at each processing element in the path, notwithstanding that various application-related data attributes are modified by one or more of the processing elements.

In operator graph 600, the stream operator 614 can have two input ports P1 and P2, and two input paths, each flowing to one of the ports. On a first path, tuples output from the stream operator 602 are input to a stream operator 604. The stream operator 604 outputs some tuples to stream operator 606 and other tuples to stream operator 608. In addition, the stream operator 606 outputs tuples to the stream operator 608. The stream operator 608 outputs tuples to the first port P1 of stream operator 614. On a second path to stream operator 614, tuples output from the stream operator 610 are input to a stream operator 612. The stream operator 612 outputs tuples to the second port P2 of stream operator 614.

In the operator graph 600, there are three paths between stream operator 614 and stream operator 626. On a first path, stream operator 614 outputs tuples to stream operator 616. Stream operator 616 outputs tuples to stream operator 626. On a second path, the stream operator 614 outputs tuples stream operator 618. Stream operator 618 can be configured to receive tuples from stream operator 614 on two input ports. Stream operator 618 receives some tuples from stream operator 614 on a first input port P3 and other tuples from stream operator 614 on a second input port P4. Further, stream operator 618 outputs some tuples to stream operator 620 and other tuples to stream operator 622. Some, but not necessarily all, of the tuples received on the first port P3 from stream operator 614 may be output to stream operator 620. In addition, some, but not necessarily all, of the tuples received on the second port P4 from stream operator 614 may be output to stream operator 622. Both of stream operators 620 and 622 output tuples to stream operator 624. Stream operator 624 outputs tuples to stream operator 626. On a third path, stream operator 614 outputs tuples to stream operator 628. Tuples output from the stream operator 628 are input to stream operator 630, which outputs tuples to stream operator 626.

The stream operator 626 outputs tuples to stream operator 632. Tuples output from stream operator 632 are output to stream operator 634.

Figure 7:
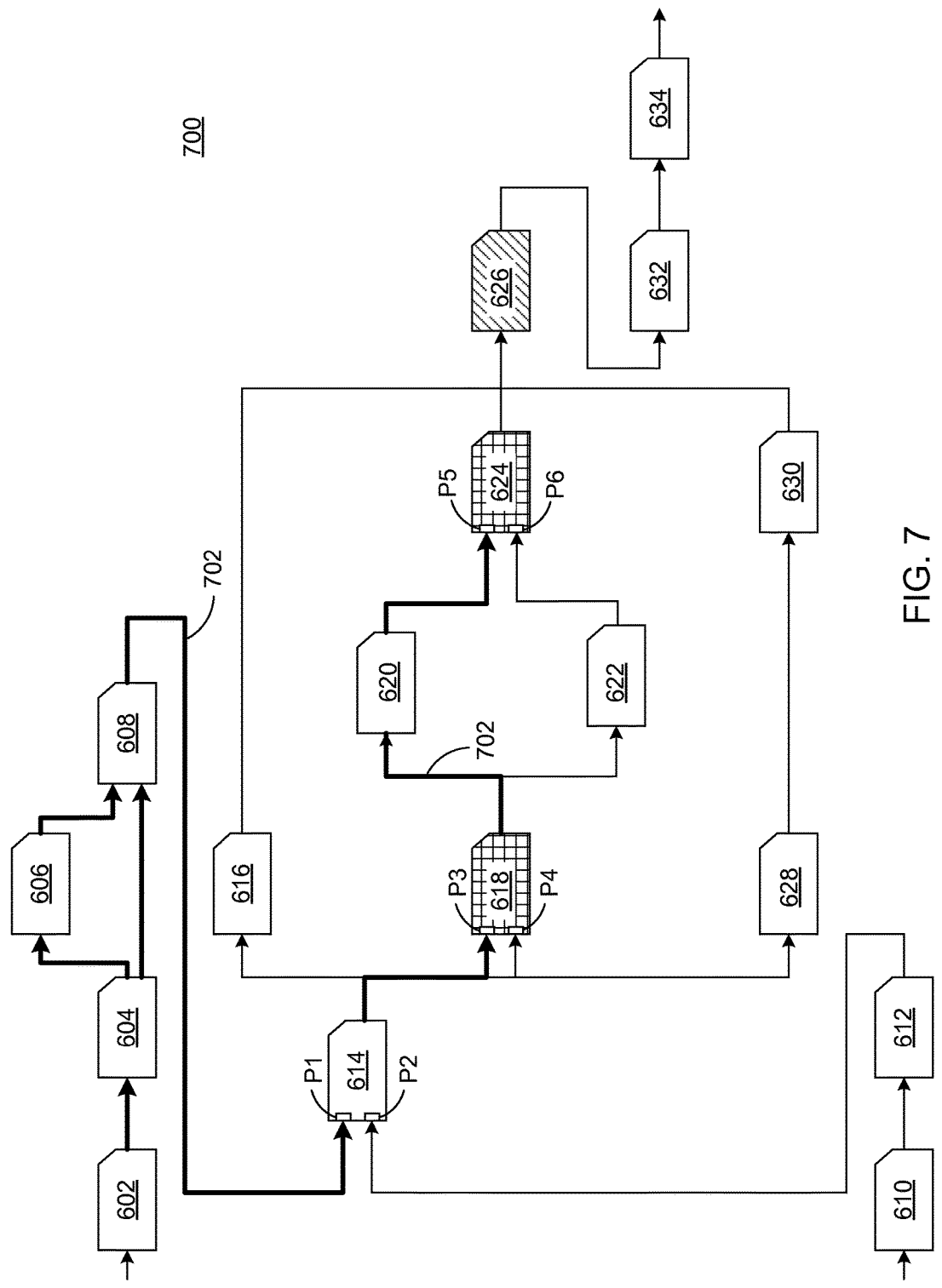
FIG. 7 is an alternative depiction of the example operator graph portion of FIG. 6 that shows a first stream operator configured with a break point that is associated with a first break point path according to various embodiments.

FIG. 7 is an alternative depiction of the example operator graph portion of FIG. 6 that shows the stream operator 626 configured with a first break point that is associated with a first break point path, according to various embodiments. In addition, FIG. 7 depicts first and second stream operators 618 and 624 configured for recording the port, operator identity, and optionally other attributes in tuples. The first break point in stream operator 626 and the first break point path 702 may be specified by a user, e.g., by a developer. The stream debugger 137 may be used to add the first break point to operator 626 and to configure operators 618, 624. The stream operators 618, 624 may be configured for recording and the first break point may be placed in operator 626 when the operators are compiled.

In the example of FIG. 7, the first break point path 702 (shown in a heavy line weight) begins a stream operator 602 and includes the stream operators 604, 606, 608, 614, 618, 620, and 624. The stream operator 618 records one or more attributes in tuples it receives on a first input port P3 and outputs tuples to operators 620 and 622. The stream operator 614 may direct some or all of the tuples received from the sub-path of stream operators 602, 604, 606, and 608 to the stream operator 618. At least some of the tuples stream operator 614 receives from the sub-path of operators 602-608 are directed to the first input port P3 of stream operator 618. Accordingly, all tuples received on the first port P3 will have traversed the sub-path of operators 602-614. All tuples output from operator 614 and received on the first input port P3 of stream operator 618 will conform to the same schema. The stream operator 618 determines that a tuple is received on its first input port P3 and adds one or more attributes to the tuple, the one or more attributes indicating the first port P3 and identifying the first stream operator 618. A recording stream operator, such as operator 618, can add a single attribute that includes both port and stream operator identifiers or two attributes, one to identify the port and one to identify the stream operator. A recording stream operator can also add other attributes, as further described below, such as an attribute containing information about the execution environment, such as a time parameter or a machine type.

The second stream operator 624 has two input ports. The second stream operator 624 determines that a tuple is received on its first input port P5 and adds an attribute to the tuple, the attribute indicating the first port P5 and identifying the second stream operator 624. All tuples received on the second port P5 will have traversed the operators 602-614 and 618-624, and will conform to the same schema.

The stream operator 626 is configured with a break point that is associated with the first break point path 702. The stream operator 626 receives tuples from stream operators 616, 624, and 630. The stream operator 626 may receive tuples from all three stream operators on a single port or on multiple ports. The break point stream operator 626 inspects the tuples it receives for the presence of attributes added by the first and second recording stream operators 618, 624. In various embodiments, when stream operator 626 determines that it has received a debug tuple, execution of program instructions in stream operator 626 is halted. In some embodiments, when stream operator 626 determines that it has received a debug tuple, a count of debug tuples is incremented. As mentioned, the count may permit a developer to determine the number of times the program instructions on the break point stream operator 626 are invoked by tuples arriving on the debug path 702 without throwing an exception. A count of debug tuples may be useful to eliminate the path 702 as a likely source of exceptions at operator 626. In this example, a tuple received at stream operator 626 that passed through stream operator 622 would not be identified by operator 626 as a debug tuple associated with the first debug path 702. Similarly, tuples received from operators 616 or 603 would not be identified as debug tuples.

Subsequent to the break point stream operator 626 determining that it has received a debug tuple and either halting execution or incrementing a count of debug tuples, the attributes added by the first and second stream recording operators 618 and 624 may be removed and the debug tuple passed downstream to stream operator 632, no longer being designated as a debug tuple. In the case of instruction execution halting, the debug tuple may be stripped of the added attributes and output before execution is halted or after execution is resumed. The added attributes may not be removed or only some of the added attributes removed in circumstances where two or more break points are simultaneously set in an operator graph. An example of circumstances where two or more break points are simultaneously set is presented below in FIG. 8.

Figure 8:
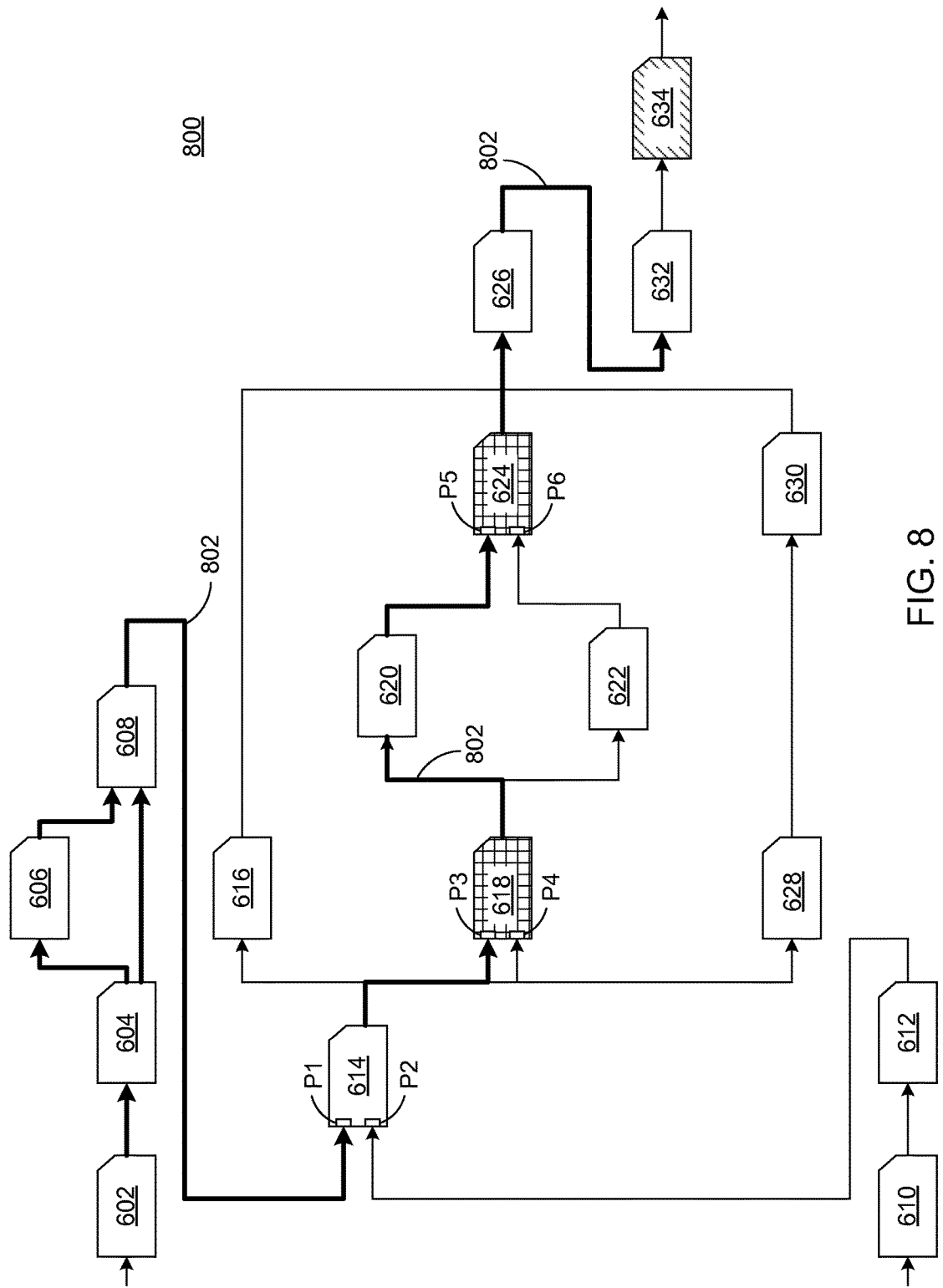
FIG. 8 is a second alternative depiction of the example operator graph portion of FIG. 6 that shows a second stream operator configured with a break point that is associated with a second break point path according to various embodiments.

FIG. 8 is a second alternative depiction of the example operator graph portion of FIG. 6 that shows the stream operator 634 configured with a break point that is associated with a second break point path, according to various embodiments. The example in FIG. 8 assumes that the stream operator 626 is simultaneously configured with two break points: a first break point that is associated with a first break point path; and a second break point that is associated with a second break point path. The first break point path is the path 702 shown in FIG. 7. The second break point path 802 (shown in a heavy line weight) begins at a stream operator 602 and includes the stream operators 604, 606, 608, 614, 618, 620, 624, 626, and 632.

FIG. 8 depicts first and second stream operators 618 and 632 configured for recording the port, operator identity, and optionally other attributes in tuples. The first recording stream operator 618 is configured in the same way as described above in the example shown in FIG. 7. The second recording stream operator 632 is configured to record attributes on tuples received on its single input port. The second stream operator 632 determines that a tuple is received on its single input port and adds an attribute to the tuple, the attribute indicating the input port and identifying the second stream operator 632. All tuples received on the input port of operator 632 will have traversed the operators 602-614 and 618-620-624-626.

The stream operator 634 is configured with a break point that is associated with the break point path 802. The break point stream operator 634 inspects the tuples it receives for the presence of attributes added by the first and second recording stream operators 618, 632. In various embodiments, when stream operator 634 determines that it has received a debug tuple, execution of program instructions in stream operator 634 is halted or a count of debug tuples is incremented. Subsequent to the break point stream operator 634 determining that it has received a debug tuple and either halting execution or incrementing a debug tuple count, the attributes added by the first and second stream recording operators 618 and 624 may be removed and the debug tuple passed downstream, no longer being designated as a debug tuple.

As the example in FIG. 8 shows, the attributes added to a tuple by the first stream recording operator 618 are used by both break point stream operators 626 and 634. As noted above in the discussion of the example of FIG. 7, the break point stream operator 626 may not remove some of the attributes added to a debug tuple in circumstances where two or more break points are simultaneously set in an operator graph. The example in FIG. 8 illustrates an example circumstance. According to various embodiments, the debug manager 135 can be employed when two or more break points associated with break point paths are simultaneously set in an operator graph. The debug manager 135 can maintain an operator usage count. If the attributes added by the first stream recording operator 618 is used by a single break point stream operator 626, as shown in the example of FIG. 7, the attributes added by operator 618 can be removed after the debug tuple is received at operator 626 as the usage count in one. On the other hand, if the attributes added by the first stream recording operator 618 is used by both break point stream operators 626 and 634 to define first and second break point paths 702 and 802, as shown in the example of FIG. 8, then the attributes added by operator 618 are not removed after the debug tuple is received at the first break point operator 626 as the usage count in two. When a debug tuple is received at the first break point operator 626, the debug manager can increment (or decrement) the usage count, and the debug tuple is output with the attributes added by operator 618. When the same debug tuple is received at the second break point operator 632 the debug manager can again increment (or decrement) the usage count. As the usage count is two, the attributes added by operator 618 are removed after the debug tuple is received at operator 634. The tuple may then be output, no longer being designated a debug tuple.

As described herein, a stream debugger may configure a recording stream operator to add one or more attributes to a tuple it receives on a particular port. In one alternative, in addition to identifiers of the input port and processing element that received the tuple, the added attributes can specify names of one or more break point paths or the identities of one or more stream operators having a break point associated with the path. For example, a recording stream operator can add attributes that name first and second break point paths or attributes that identify first and second break point stream operators, which respectively have break points associated with the first and second break point paths. When a debug tuple having these added attributes is received at the first stream operator having a break point associated with the first break point path, the first stream operator deletes the name of the first break point path or its identity from the debug tuple, leaving the name of the second break point path or the identity of the second break point operator in the debug tuple. In addition, the first stream operator determines that another break point path or break point stream operator is identified in the attributes, and does not delete the input port and the identity of the recording processing element from the debug tuple. The first stream operator outputs the debug tuple. When the debug tuple is received at the second stream operator, which is downstream of the first stream operator, the second stream operator deletes the second break point path or its identity from the debug tuple. The second stream operator determines that no other break point paths or break point stream operators are identified in the attributes of the debug tuple. In response to this determination, the second stream operator deletes the added attributes that recording stream operator and recording stream operator port.

Figure 9:
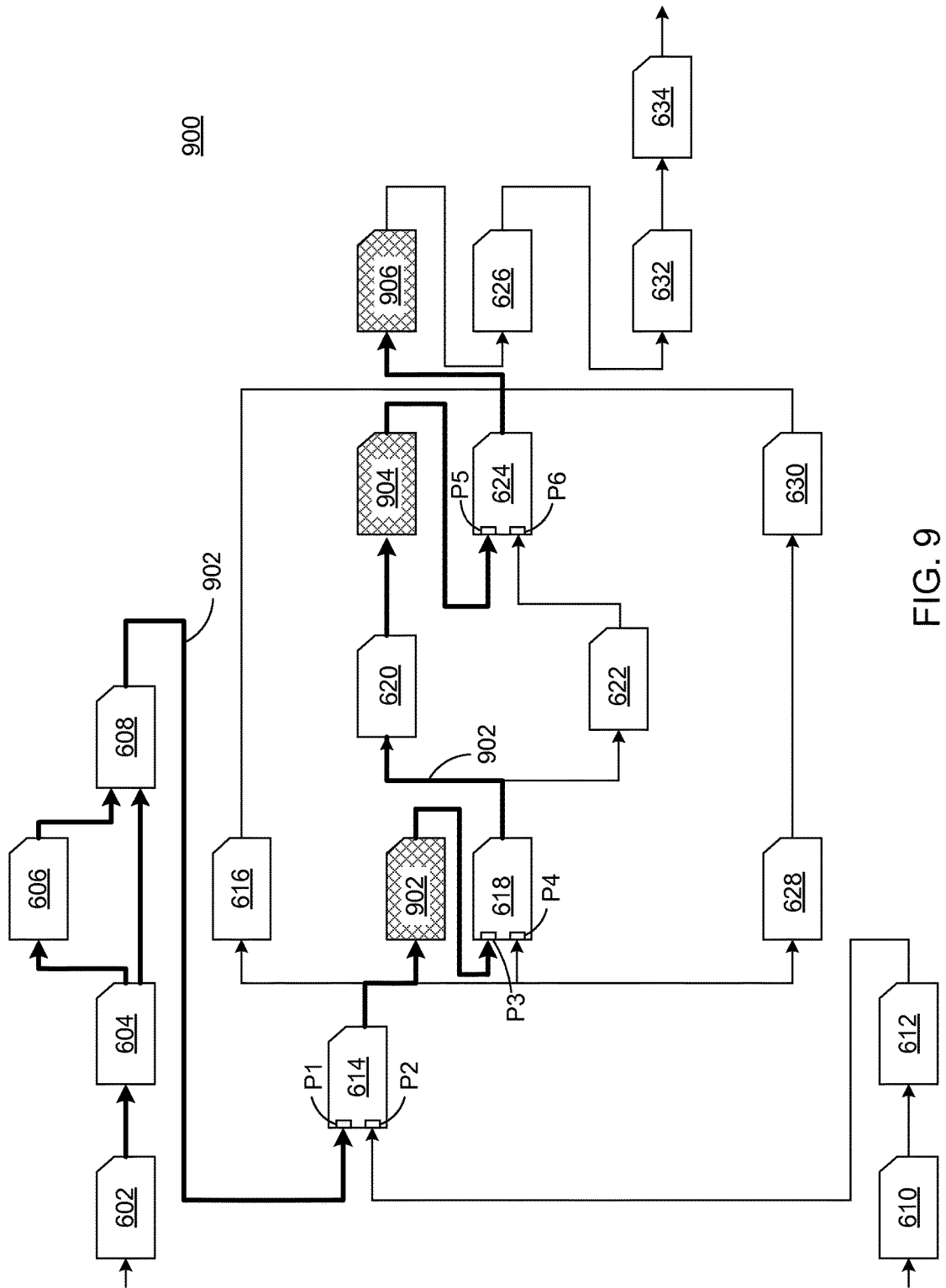
FIG. 9 is a third alternative depiction of the example operator graph portion of FIG. 6 that includes additional decorator stream operators according to various embodiments.

FIG. 9 is an alternative depiction of the example portion of an operator graph for a stream-based computing application of FIG. 6 that includes additional "decorator" stream operators 902, 904, and 906. The example in FIG. 9 is similar to the example of FIG. 7 in that the break point path 902 includes the same stream operators as the break point path 702. Specifically, the break point path 902 includes operators 602, 604, 606, 608, 614, 618, 620, and 624. In addition, while the example of FIG. 9 does not include a break point in the stream operator 626, it does include the decorator operator 906, which includes a break point, directly upstream of operator 626.

First and second decorator stream operators 902 and 904 are configured for recording the port, operator identity, and optionally other attributes in tuples. First decorator operator 902 is directly upstream of operator 618. When a tuple is received at decorator operator 902, it records the identities of the first port P3 of operator 618 and the operator 618 as an added attribute of the tuple. In a similar manner, when a tuple is received at decorator operator 904, it records the identities of the first port P5 of operator 624 and the operator 624 as an added attribute of the tuple. When the decorator operator 906 determines that it has received a debug tuple, the decorator operator can alert a user. The user may then inject the debug tuple into stream operator 626 and monitor execution of program instructions in stream operator 626 as it processes the injected debug tuple. Alternatively, when the decorator operator 906 determines that it has received a debug tuple, a count of debug tuples can be incremented and the debug tuple output. Attributes added to tuples by the first and second decorator stream operators 902 and 904 can be removed by the decorator operator 906 using the same processes described above for break point stream operators.

The example of FIG. 9 allows a break point to be associated with the same path as the example of FIG. 7. The use of the decorator operators in the example of FIG. 9 does not require, however, that the operators 618, 624, and 626 be modified. Modifying the operators 618, 624, and 626 to include recording or break point instructions can require re-compiling the operators. The use of the decorator operators eliminates the need to compile stream operators in an operator graph. In addition, the decorator operators can be added dynamically to an operator graph while it is running. Accordingly, the use of decorator operators may be advantageous in some circumstances.

Figure 10:
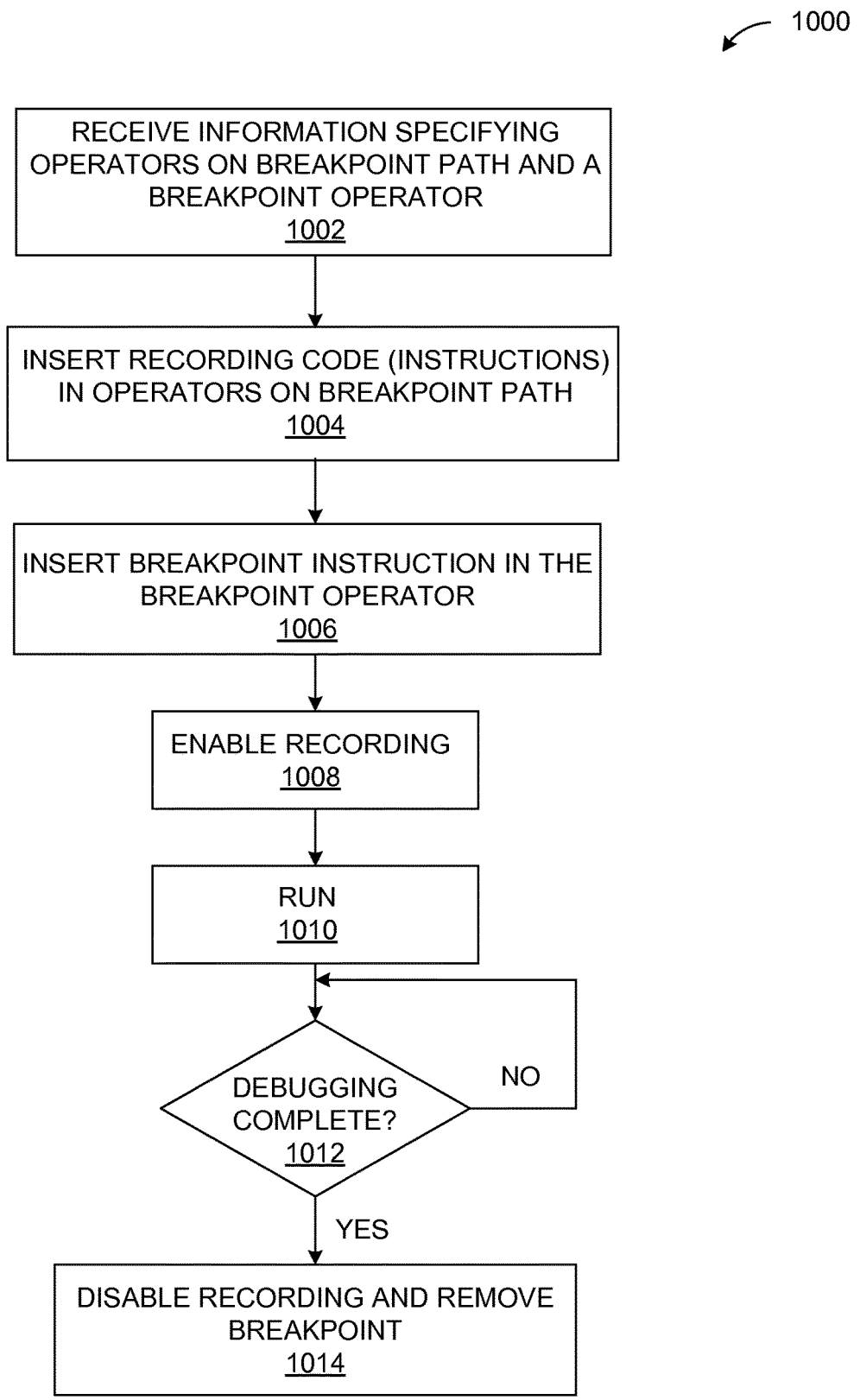
FIG. 10 shows a method for using path-specific break points in stream computing according to various embodiments.

FIG. 10 shows a method 1000 for using path-specific break points in stream computing. In operation 1002, information can be received, the information specifying a break point path in an operator graph and stream operator having a break point associated with the break point path. The specifying of the break point path can include specifying recording stream operators on the path. In operation 1004, various stream operators are configured as recording stream operators that add attributes to tuples they receive. In an alternative embodiment, various decorator operators are configured to add attributes to tuples and are inserted into the operator graph. In the case of a recording stream operator, the attributes identify the port the tuple was received on and the identity of the recording stream operator. In the case of a decorator operator, the attributes may identity a downstream stream operator and a port of the downstream operator that receives output from the decorator. The recording and decorator stream operators may optionally add additional attributes, such as information about the execution environment. For example, a time parameter, a machine type, operating system, application or operating system version, or memory configuration and usage can be optionally added to a tuple. In operation 1006, a stream operator is configured with a break point that is associated with a break point path. In an alternative embodiment, a decorator operator is configured with a break point associated with a break point path and inserted into the operator graph. Operation 1008 contemplates that recording by a recording stream operator can be dynamically enabled or disabled. In operation 1008, recording is enabled in the recording stream operators. In operation 1010, the stream-based computing application is run. The methods described with respect FIGS. 11 and 12 can be performed while the application is being run. In operation 1012, it is determined whether a debugging or similar session is complete. Operation 1014 can be performed after the session is complete. In operation 1014, the recording function in the recording stream operator can be removed or disabled. In an alternative, the decorators configured for recording can be removed from the operator graph. In addition, in operation 1014, the break point in the break point stream operator can be removed or disabled. In an alternative, the decorator configured for detecting a debug tuple can be removed from the operator graph.

Figure 11:
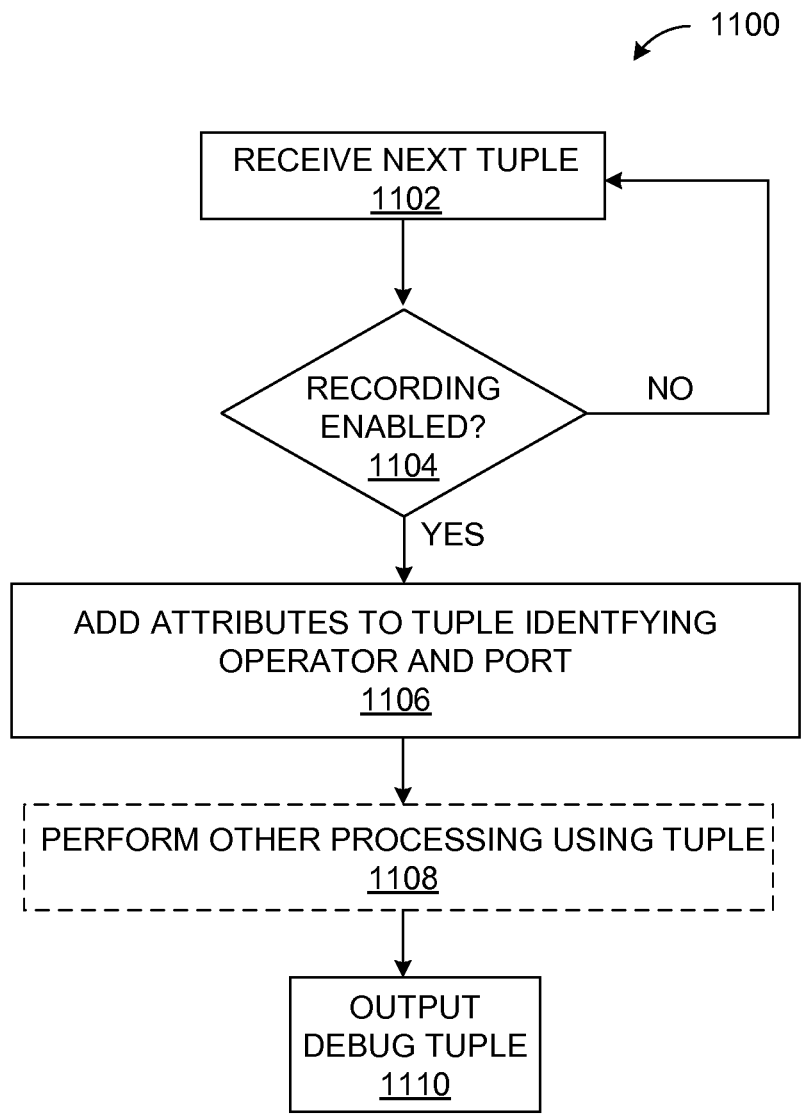
FIG. 11 shows a method that can be used at a recording stream operator in a stream computing application employing path-specific break points according to various embodiments.

FIG. 11 shows a method 1100 that can be used at a recording stream operator in a stream computing application employing path-specific break points, according to various embodiments. The method 1100 can also be used at a decorator configured for recording. In operation 1102, a tuple is received. Operation 1104 contemplates that recording by a recording stream operator can be dynamically enabled or disabled. If a recording stream operator is not dynamically enabled, the operation 1104 may be omitted. In operation 1104, it is determined whether recording is enabled. If recording is enabled, the method moves to operation 1106. In operation 1106, at least one attribute is added to the tuple, which transform the tuple into a debug tuple. One attribute can be added that identifies a port on which the tuple was received and identifies the stream operator at which the tuple was received. Alternatively, two attributes can be added, one to identify the port and one to identify the stream operator. A recording stream operator can optionally also add other attributes, such as an attribute containing information about the execution environment. The one or more optional attributes can identify processing time, a time stamp, a machine type, operating system, application or operating system version, or memory configuration and usage. In operation 1108, processing can be performed using the tuple. The processing in operation 1108 is application specific and may or may not include modifying various attributes of the tuple. In operation 1110, the recording stream operator outputs the debug tuple.

Figure 12:
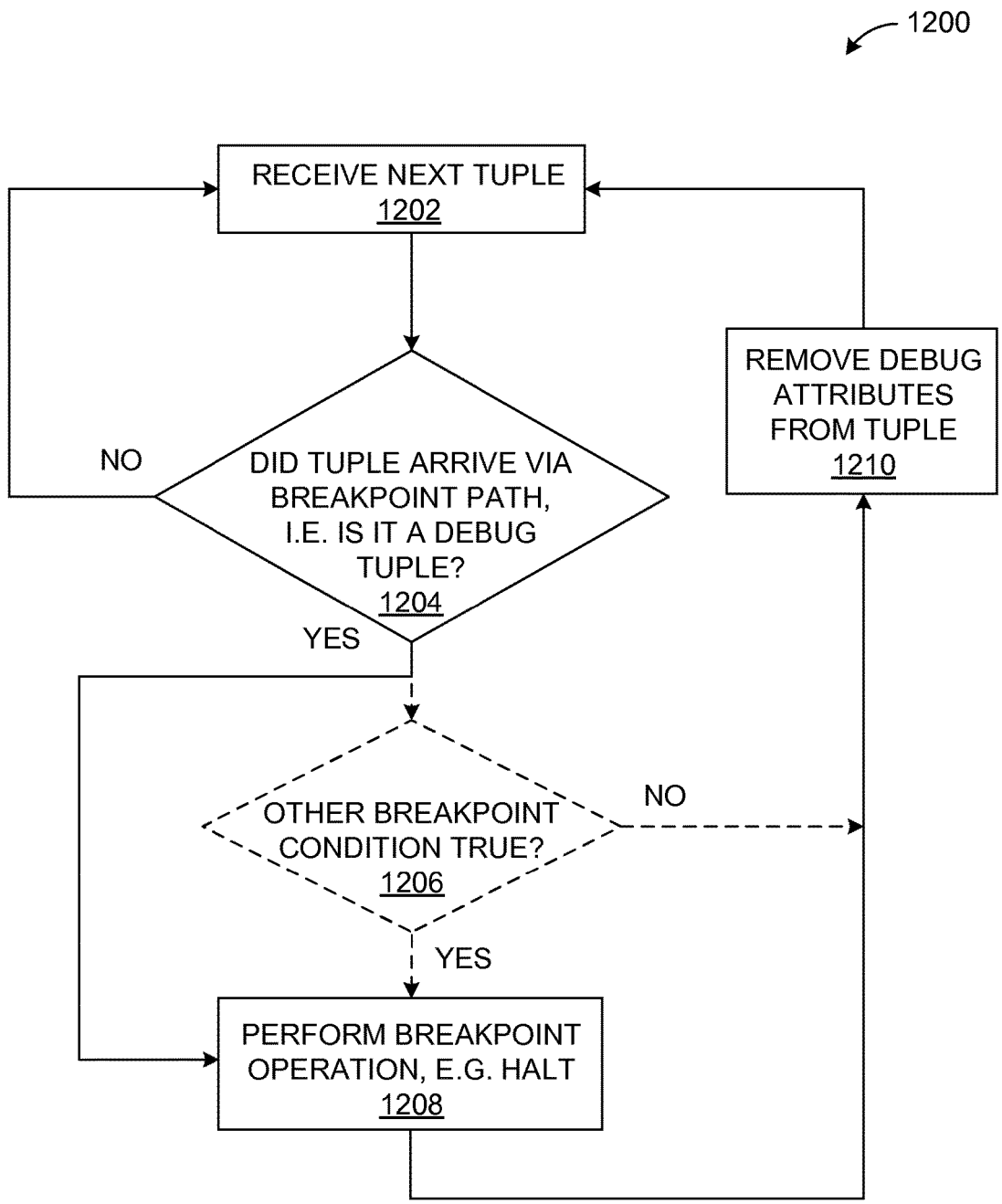
FIG. 12 shows a method that can be used at a break point stream operator in a stream computing application employing path-specific break points according to various embodiments.

FIG. 12 shows a method 1200 that can be used at a break point stream operator in a stream computing application employing path-specific break points, according to various embodiments. The method 1200 can also be used at a decorator stream operator configured for detecting a debug tuple. In operation 1202, a tuple is received at a stream operator having a break point associated with a break point path. In operation 1204, it is determined whether the tuple is a debug tuple. If the tuple arrived at the break point stream operator (or decorator stream operator) via the path associated with the break point, the method moves to optional operation 1206. Otherwise the method returns to operation 1202. In operation 1204, it can optionally be determined whether an additional or alternative qualifier or condition is satisfied. Any suitable qualifier or condition can be evaluated. For example, it can be determined whether a particular numeric attribute of the debug tuple is within a specified range. If operation 1206 is included, and the additional condition is not satisfied, the method moves to operation 1210. If the additional condition is satisfied, the method moves to operation 1208. Accordingly, the operation 1208 is contingent on an additional or alternative condition, such as an environmental condition, being satisfied. In operation 1208, an operation can be performed in response to determining that a received tuple is a debug tuple and, optionally, satisfaction of one or more additional conditions. As described above, operation 1208 can include halting execution of program instructions in the break point stream operator. As also described above, in some embodiments, operation 1208 can include incrementing a count of debug tuples. In operation 1210, port identifier, recording stream operator identifier, and any optionally added attributes can be removed from the debug tuple, provided the added attributes are not used to define another break point path used by another break point stream operator. If a recording stream operator adds attributes to tuples it receives that are used by two or more break point operators, the operation 1208 can include checking a usage count, incrementing or decrementing the usage count. The operation 1208 can include removing the added attributes when the usage count indicates that the added attributes are not needed by any break point stream operator.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and a streams programming language, such as IBM Streams Processing Language (SPL). The program code may execute as specifically described herein. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A method for processing a stream of tuples, comprising:

receiving a stream of tuples to be processed by a plurality of processing elements operating on one or more computer processors, each processing element having one or more stream operators;

adding, by a first stream operator, a first attribute to a tuple received on a first port of the first stream operator, the first attribute indicating the first port of the first stream operator and identifying the first stream operator;

adding, by a second stream operator, a second attribute to a tuple received on a first port of the second stream operator, the second attribute indicating the first port of the second stream operator and identifying the second stream operator;

determining whether a debug tuple has been received by a third stream operator, the debug tuple being a tuple that includes the first and second attributes; and performing an operation in response to determining that a debug tuple has been received.

2. The method of claim 1, wherein the operation is halting execution of program instructions at the third stream operator.

3. The method of claim 1, wherein the operation is incrementing a count of debug tuples received at the third stream operator.

4. The method of claim 1, further comprising determining whether an execution environment condition is true, wherein the performing of the operation is contingent on determining that the execution environment condition is true.

5. The method of claim 4, wherein the execution environment condition includes one or more of a time parameter, a machine type parameter, an operating system parameter, a version parameter, or a memory parameter.

6. The method of claim 4, further comprising adding, by the first stream operator, a third attribute to a tuple received on a first port of the first stream operator, the third attribute specifying an execution environment parameter.

7. The method of claim 1, wherein the first stream operator is a decorator stream operator.

8. The method of claim 1, wherein the third stream operator is a decorator stream operator.

9. A computer program product for processing a stream of tuples, the computer program product comprising a computer readable storage medium having program code embodied therewith, the program code comprising computer readable program code configured to:

receive a stream of tuples to be processed by a plurality of processing elements operating on one or more computer processors, each processing element having one or more stream operators;

add, by a first stream operator, a first attribute to a tuple received on a first port of the first stream operator, the first attribute indicating the first port of the first stream operator and identifying the first stream operator;

add, by a second stream operator, a second attribute to a tuple received on a first port of the second stream operator, the second attribute indicating the first port of the second stream operator and identifying the second stream operator;

determine whether a debug tuple has been received by a third stream operator, the debug tuple being a tuple that includes the first and second attributes;

determine whether there is an additional condition that must be satisfied by an additional attribute of the debug tuple, wherein the additional attribute of the debug tuple identifies one or more of a time parameter, a machine type parameter, an operating system parameter, a version parameter, or a memory parameter; and perform an operation in response to determining that the debug tuple has been received and that the additional condition is satisfied.

10. The program product of claim 9, wherein the operation is halting execution of program instructions at the third stream operator.

11. The program product of claim 9, wherein the operation is incrementing a count of debug tuples received at the third stream operator.

12. A system for processing a stream of tuples, comprising:

a plurality of processing elements stored in a memory to receive a stream of tuples, the processing elements operating on one or more computer processors, each processing element having one or more stream operators, the plurality of processing elements including:

a first stream operator configured to add a first attribute to a tuple received on a first port of the first stream operator, the first attribute indicating the first port of the first stream operator and identifying the first stream operator;

a second stream operator configured to add a second attribute to a tuple received on a first port of the second stream operator, the second attribute indicating the first port of the second stream operator and identifying the second stream operator;

a third stream operator configured to determine whether a debug tuple has been received at the third stream operator, the debug tuple being a tuple that includes the first and second attributes; and a component configured to perform an operation in response to determining that a debug tuple has been received.

13. The system of claim 12, wherein the operation is halting execution of program instructions at the third stream operator.

14. The system of claim 12, wherein the operation is incrementing a count of debug tuples received at the third stream operator.

15. The system of claim 12, wherein the third stream operator is further configured to determine whether an execution environment condition is true, wherein the performing of the operation is contingent on determining that the execution environment condition is true.

16. The system of claim 15, wherein the execution environment condition includes one or more of a time parameter, a machine type parameter, an operating system parameter, a version parameter, or a memory parameter.

17. The system of claim 12, wherein the first stream operator is further configured to add a third attribute to a tuple received on a first port of the first stream operator, the third attribute specifying an execution environment parameter.

18. The system of claim 12, wherein the first stream operator is a decorator stream operator.

19. The system of claim 12, wherein the third stream operator is a decorator stream operator.

* * * * *